US005422596A

United States Patent [19]

Armstrong et al.

[11] Patent Number: 5,422,596

[45] Date of Patent: Jun. 6, 1995

[54] HIGH POWER, BROADBAND FOLDED WAVEGUIDE GYROTRON-TRAVELING-WAVE-AMPLIFIER

[75] Inventors: Carter M. Armstrong, Kildeer, Ill.; Jin J. Choi, North Potomac, Md.; Achintya K. Ganguly, Alexandria, Va.

[73] Assignee: The United States of America as represented by the Secretary of the Navy, Washington, D.C.

[21] Appl. No.: 269,278

[22] Filed: Jun. 30, 1994

[51] Int. Cl.[6] .......................... H01J 25/34; H01S 1/00

[52] U.S. Cl. .......................... 330/4; 315/5

[58] Field of Search .......................... 330/4, 4.7; 315/3.5, 315/5; 332/129, 134

[56] References Cited

U.S. PATENT DOCUMENTS

| | | | |
|---|---|---|---|
| 4,224,576 | 9/1980 | Granatstein et al. | 330/4 |
| 4,362,968 | 12/1982 | Chu et al. | 315/3.5 |
| 4,533,875 | 8/1985 | Lau et al. | 330/4 |
| 4,554,483 | 11/1985 | Baird et al. | 315/5 |
| 4,554,484 | 11/1985 | Read et al. | 315/4 |
| 4,695,766 | 9/1987 | Waterman | 315/3.5 |
| 5,015,914 | 5/1991 | Ives et al. | 315/4 |

OTHER PUBLICATIONS

G. Döhler, D. Gallagher, J. Richards, "Millimeter Wave Folded Waveguide TWTs", *Northrop ES-D-RMS,* Rolling Meadows, Illinois.

*Primary Examiner*—Nelson Moskowitz

*Attorney, Agent, or Firm*—Thomas E. McDonnell; George Jameson

[57] ABSTRACT

A folded waveguide gyrotron-traveling-wave-amplifier comprises: an electron gun for transmitting an axis-encircling beam of electrons with large transverse energy along a first path having an axis; an RF source for producing and applying in a second path an RF input millimeter wave signal having a bandwidth in a preselected frequency domain and having a transverse electric field; a source for generating a solenoid magnetic field parallel to the axis along the first path; a beam collector; and an interaction circuit such as an H-plane bend serpentine waveguide positioned within the solenoid magnetic field and having a narrow wall containing a beam tunnel hole for passing the axis-encircling beam of electrons therethrough to the beam collector, an output end, and an input end for receiving and passing the RF input millimeter wave signal through the H-plane bend serpentine waveguide to the output end to modulate the axis-encircling electron beam, the modulated axis-encircling electron beam amplifying the RF input signal and also broadening the instantaneous bandwidth of the amplified RF input signal through the negative mass instability in the fundamental forward space harmonic of both fast and slow wave regions in the preselected frequency domain. In a second embodiment, a double-ridged TE folded waveguide is used in place of the H-plane bend serpentine waveguide. In a third embodiment, there is no RF input signal and the interaction circuit generates an RF signal which is outputted from one of the input and output ends.

21 Claims, 8 Drawing Sheets

HIGH POWER, BROADBAND FOLDED WAVEGUIDE GYROTRON-TRAVELING-WAVE-AMPLIFIER

BACKGROUND OF THE INVENTION

1. Field of the Invention

The present invention relates generally to gyrotron-traveling-wave-amplifiers and particularly to a folded waveguide, gyrotron-traveling-wave-amplifier capable of producing high power, broadband millimeter wave radiation.

2. Description of the Related Art

Broadening the instantaneous bandwidth (BW >10%) of high power millimeter wave amplifiers remains a critical issue in high power vacuum electronics. Light weight, compactness and low-cost are also important factors to be met for both practical military and commercial applications. Military applications include high resolution radar/communications and electronic jamming equipments. Commercial applications include navigation equipments for airborne and ship-board systems, high efficiency satellite communication systems, low-cost millimeter-wave material processing, millimeter wave imaging systems, and RF test and measurements.

Use of free electron beams (linear beam and rotating beam) in vacuum tubes has been recognized as a promising source of multi-kilowatt high power, broadband millimeter wave radiation, operating at a moderate beam voltage (<60 kV). Uniform waveguide gyro-amplifiers cannot produce an instantaneous bandwidth in excess of 10%, unless the waveguide is loaded so that the wave phase velocity becomes constant over a wide frequency range. Conventional approaches for achieving wideband (BW>10%) RF amplification in gyro-tron-traveling-wave-amplifiers are either loading disks or dielectric in the waveguide to slow down the RF phase velocity of the wave or tapering both the waveguide and the external magnetic field along the axial distance. Since the azimuthal and axial beam modulations in the beam-wave interaction of the conventional gyrotron-traveling-wave-amplifier devices compete with each other, the operating frequency band is either in the fast wave region (negative mass instability) or in the slow wave region (Weibel instability). This is one of the main limits to broadening the instantaneous bandwidth. The present inventors do not know of any gyro-tron-traveling-wave-amplifiers in the prior art that can be operated simultaneously in both the 'fast' and 'slow' wave regions, continuously across the light line intersection.

SUMMARY OF THE INVENTION

It is therefore an object of the invention to provide a compact, low cost, gyrotron-traveling-wave-amplifier capable of producing high power, broadband millimeter wave radiation.

Another object of the invention is to provide a folded waveguide, gyrotron-traveling-wave-amplifier capable of producing high power, broadband millimeter wave radiation.

Another object of the invention is to provide an H-plane bend, serpentine waveguide amplifier.

Another object of the invention is to provide a double-ridged, transverse electic, folded waveguide amplifier.

Another object of the invention is to provide a folded waveguide gyrotron oscillator in a third embodiment of the invention.

A further object of the invention is to provide an H-plane bend rectangular serpentine waveguide in which an input axis-encircling electron beam and an input RF millimeter wave mutually interact with each other within the serpentine waveguide to cause transverse beam modulation of the electron beam and RF amplification of the RF signal and a broadening of the instantaneous bandwidth of the amplified RF signal to occur by way of the negative mass instability in the fundamental forward space harmonic of both fast and slow wave regions.

These and other objects of this invention are achieved by providing a folded waveguide gyrotron-traveling-wave-amplifier for producing high power, broadband, millimeter wave radiation. The invention includes an electron gun, an H-plane bend serpentine rectangular waveguide having input and output ends, and a beam collector in a first embodiment of the invention. In operation, the electron gun injects an axis-encircling electron beam through a beam tunnel hole of a narrow wall of the serpentine rectangular waveguide. The injected electron beam is modulated by the transverse electric field of an RF input signal applied to the input end. The modulated electron beam amplifies the RF input signal and broadens the instantaneous bandwidth of the amplified RF signal input through the negative mass instability in the fundamental forward space harmonic of both the "fast" and "slow" wave regions. The amplified RF input signal is outputted from the output end. In a second embodiment, a double-ridged TE folded waveguide is used in place of the H-plane bend serpentine waveguide.. In a third embodiment, there is no RF input signal and the interaction circuit generates an RF signal which is outputted from one of the input and output ends.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENTS

Figure 1:
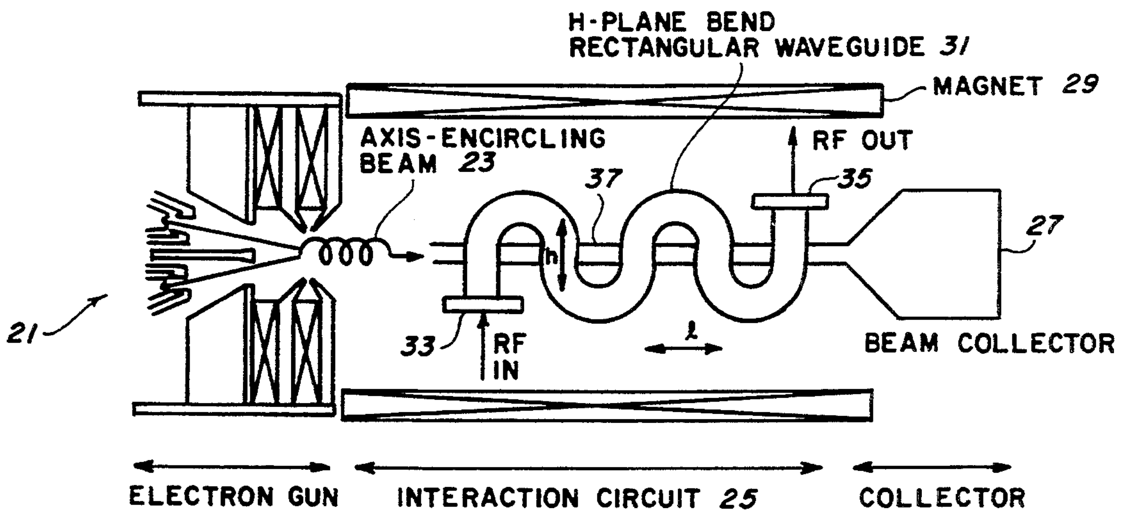
FIG. 1 is a schematic diagram of a folded waveguide gyrotron-traveling-wave-amplifier in a first embodiment of the invention.

Referring now to the drawings, FIG. 1 is a schematic diagram of a folded waveguide gyrotron-traveling-wave-amplifier in a first embodiment of the invention.

The folded waveguide gyrotron-traveling-wave-amplifier of FIG. 1 is comprised of an electron beam source such as an electron gun 21 for emitting a high-power axis-encircling electron beam 23, an interaction circuit 25 and a beam collector 27. A magnet 29, such as a permanent magnet or an electromagnet, develops a solenoid magnetic field around the interaction circuit 25 with an exemplary magnetic field strength of from about 1 Tesla to about 4 Tesla.

The interaction circuit 25 is an H-plane bend rectangular serpentine waveguide 31 in which the orientation of the magnetic field changes along the H-plane bend rectangular serpentine waveguide 31. As is well known, this rectangular waveguide 31 has narrow and wide walls. The rectangular waveguide 31 includes a first end 33, a second end 35 and a beam tunnel hole (not shown) which passes through the narrow wall of the rectangular waveguide 31. An input RF signal, having a preselected frequency centered in a bandwidth or desired frequency range in a preselected frequency domain and having a transverse electric field, is applied to the first end 33 of the rectangular waveguide 31 and propagates through the rectangular waveguide 31.

The high-power, axis-encircling electron beam 23 from the electron gun 21 can be, for example, a 350 kW beam (a 70 kV, 5A beam). This electron beam is injected through the beam tunnel hole in the narrow wall of the rectangular waveguide 31. When the electron beam passes through the narrow wall of the rectangular waveguide 31 along a path 37 it has phase synchronization with the RF phase velocity of the RF signal propagating through the rectangular waveguide 31. Such phase synchronization is produced because the interaction circuit 25 interacts with the RF phase velocity to slow the RF phase velocity down so that the RF phase velocity becomes synchronized with the electron beam velocity. In other words, the RF magnetic field changes its orientation around the bends of the H-plane bend rectangular waveguide 31, so that the transverse electric field can interact with the transverse momentum of the electron beam 23.

Under this operational condition, the high-power axis-encircling electron beam 23 exchanges energy with the transverse electric field in the H-plane bend rectangular waveguide 31. As a result, the injected electron beam 23 is modulated by the transverse electric field of the RF signal. The modulated electron beam 23 then amplifies the RF signal through the negative mass instability in the fundamental forward space harmonic of both the "fast" and "slow" wave regions in the preselected frequency domain. The amplified RF signal is coupled out of the second end 35 of the rectangular serpentine waveguide 31, while the remaining electron beam energy left after interaction with the amplified RF signal propagates through the beam tunnel hole in the rectangular waveguide 31 to the beam collector 27.

The beam collector 27 is preferably a depressed beam collector. A depressed collector is a beam collector 27 which has a preselected negative voltage applied to it (but less negative than the negative potential of the electron beam from the electron gun 21) in order to collect the unused electron beam energy for subsequent use in the system. Such reuse of unused electron beam energy enhances the efficiency of the overall system.

The electron beam energy and the RF signal are kept separate from each other. No RF signal is coupled through the beam tunnel hole to the beam collector 27 because the gap (not shown) between the walls (not shown) of the rectangular waveguide 31 is thick enough that the traveling wave of the RF signal does not couple directly through the beam tunnel hole. It should be recalled that the beam tunnel hole is located on the narrow wall of the rectangular waveguide 31, where the RF electric field of the operating TE mode ($TE_{10}$) is zero. Therefore, the beam tunnel hole can be made larger without distorting the electric field structure, and a high power electron beam with high current can be transmitted through the circuit.

Figure 2:
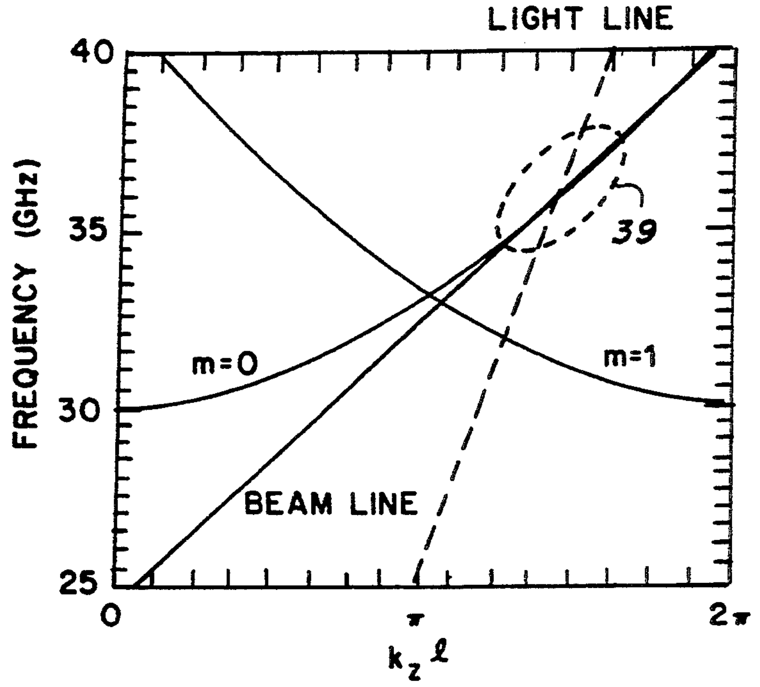
FIG. 2 is a graph of the dispersion diagram of the folded waveguide gyrotron-traveling-wave-amplifier of FIG. 1.

FIG. 2 is a graph of the dispersion diagram of the folded waveguide gyrotron-traveling-wave-amplifier of FIG. 1. More specifically, FIG. 2 shows that the transverse beam modulation and RF amplification originate from the negative mass instability in the fundamental forward space harmonic of both the "fast" and "slow" wave regions of the dispersion diagram for the folded waveguide gyrotron-traveling-wave-amplifier of FIG. 1. In the graph of FIG. 2, the various symbols can be defined as:

$m=0$ is the 0 space harmonic mode, which is the forward wave.

$m=1$ is the first space harmonic, which is the backward wave.

beam line = the beam cyclotron line.

light line = the dotted line.

fast wave = anything to the left of the light line.

slow wave = anything to the right of the light line.

In the fast wave region, the phase velocity ($v_{ph}$) is actually greater than the speed of light (C), as shown in the equation:

$$v_{ph}=\omega/k_z>C \quad (1)$$

That is why it is called a fast wave.

In the slow wave region, the phase velocity ($v_{ph}$) is less than the speed of light (C), as shown in the equation:

$$v_{ph}=\omega/k_z<C \quad (2)$$

That is why it is called a slow wave.

Interaction occurs in the folded waveguide gyrotron-traveling-wave-amplifier of FIG. 1 when the phase velocity of the forward wave (m=0) is synchronized with the phase velocity of the beam line (beam cyclotron line). As mentioned before, the invention can operate in both of the fast wave and slow wave regions. More specifically, it can operate in the operating region designated by the dashed area 39. Note that this operating region within area 39 covers part of the slow wave region and part of the fast wave region, and that there is continuous interaction across the light line. This is the most important operational difference between the present invention and a conventional gyrotron tube. A conventional gyrotron tube can operate in only one single region—in either the fast wave region or the slow wave region—but not in both regions. This is the fundamental reason why the bandwidth cannot be extended in a prior art or conventional gyrotron tube. In order to extend the bandwidth, it would be necessary to cover parts of both of the fast and slow regions. Otherwise a gain dip will occur near the intersection of the light line, which will cause a discontinuity in the bandwidth.

Thus, FIG. 2 shows the phase synchronism between the RF phase velocity and the beam phase velocity and the operating region 39 where the RF phase velocity is synchronized with the beam phase velocity.

Figure 3:
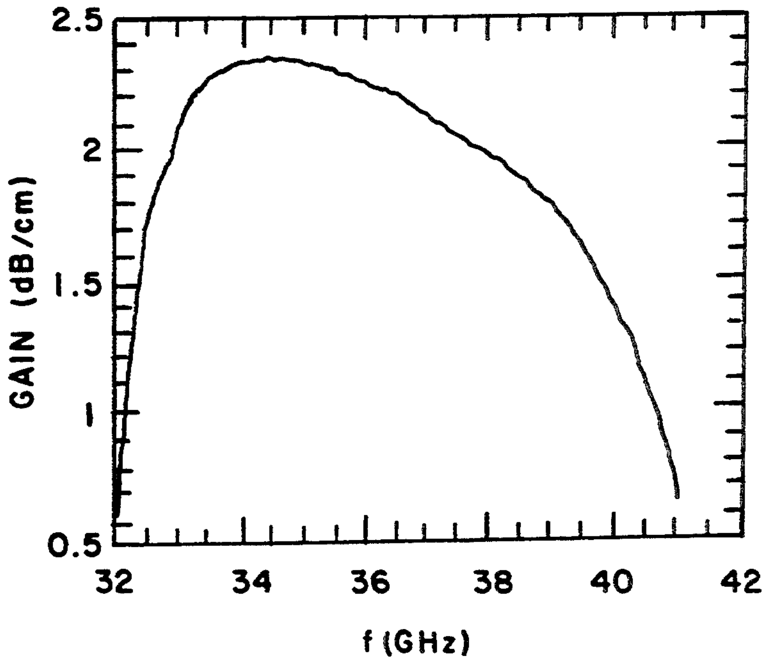
FIG. 3 is a graph of signal gain versus frequency for the rectangular folded waveguide gyrotron-traveling-wave-amplifier of FIG. 1.

FIG. 3 is a graph of signal gain versus frequency for the rectangular folded waveguide gyrotron-traveling-wave-amplifier of FIG. 1, using linear theory. From FIG. 3 information can be derived as to the bandwidth and gain that can be obtained from, for example, the folded waveguide gyrotron-traveling-wave-amplifier of FIG. 1. As shown in FIG. 2, the light line crossed at about 36 GHz. Thus, in this particular example, FIG. 3 shows that at 36 GHz the bandwidth is about 15% and the gain is about 2.3 dB/cm. Note that there is no discontinuity of gain between the fast wave and the slow wave region, indicating that broadband operation is feasible in the folded waveguide gyrotron-traveling-wave-amplifier of FIG. 1.

A $2\frac{1}{2}$ dimensional particle-in-cell, non-linear code, MAGIC has been used to verify the electron negative mass instability in the H-plane bend, rectangular serpentine waveguide of FIG. 1. The MAGIC code was developed by Mission Research corporation, Newington, Va., is well known on the art, and stands for magnet insulation code. This MAGIC code simulates any problem like, for example, an electron beam, an ion beam, an electromagnetic wave, that is involved in a system. It calculates Maxwell equations for electromagnetic properties, for energy exchanges and for other matters. In the folded waveguide gyrotron-traveling-wave-amplifier of FIG. 1, an electron beam and an electromagnetic wave are utilized. The MAGIC code was utilized to look at the interaction mechanism between the electron beam and the electromagnetic wave. However, due to a code limitation on the number of grids and long simulation times, simulations were performed with a circuit of 20 periods.

Figure 4:
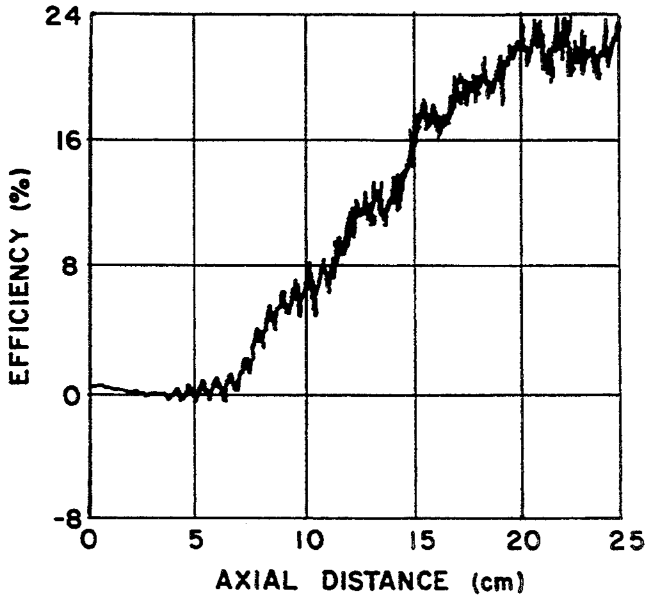
FIG. 4 is a graph of the output obtained from the use of the MAGIC code, showing RF power growth along the axial distance through the interaction circuit of FIG. 1.

FIG. 4 is a graph of the output obtained from the use of the MAGIC code, showing RF power growth along the axial distance through the interaction circuit of FIG. 1. More particularly, FIG. 4 shows a typical plot of power conversion efficiency versus axial distance where V=61.5 kV, I=3 A, $\alpha$=1.0, B=9.8 kG, f=32.5 GHz, input power=25 W. Simulation showed a saturated efficiency of 22%, corresponding to high power radiation of ~40 kW. Higher RF power extraction from electron beam energy is expected with higher e and increased beam current, and by employing axial magnetic field tapering along the device. It should be noted that efficiency enhancement through magnetic field tapering is not possible with a conventional folded waveguide traveling wave tube.

Figure 5:
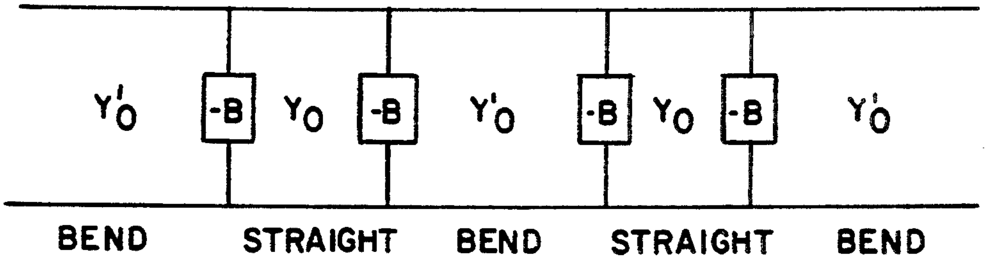
FIG. 5 illustrates the equivalent circuit model of the interaction circuit of FIG. 1, representing periodic bends and periodic straight sections of the interaction circuit.

FIG. 5 illustrates the equivalent circuit model of the interaction circuit of FIG. 1, representing periodic bends $Y_0'$ and periodic straight sections $Y_0$ and a inductive shunt susceptance $-B$ of the interaction circuit.

When a wave phase in the periodic folded waveguide circuit changes by $n\pi$ where n is an integer number, RF scattering is in phase and adds up along the guide, resulting in a series of bandgaps or stopbands in a frequency domain. Dispersion characteristics and bandgaps have been analyzed by the use of the equivalent circuit model of the interaction circuit 25 of FIG. 1, as shown in FIG. 5. The waveguide bend is modeled as a uniform transmission line with a characteristic admittance $Y_0'$, a inductive shunt susceptance $-B$, and a guide wavelength $\lambda_{g\phi}$.

Figure 6:
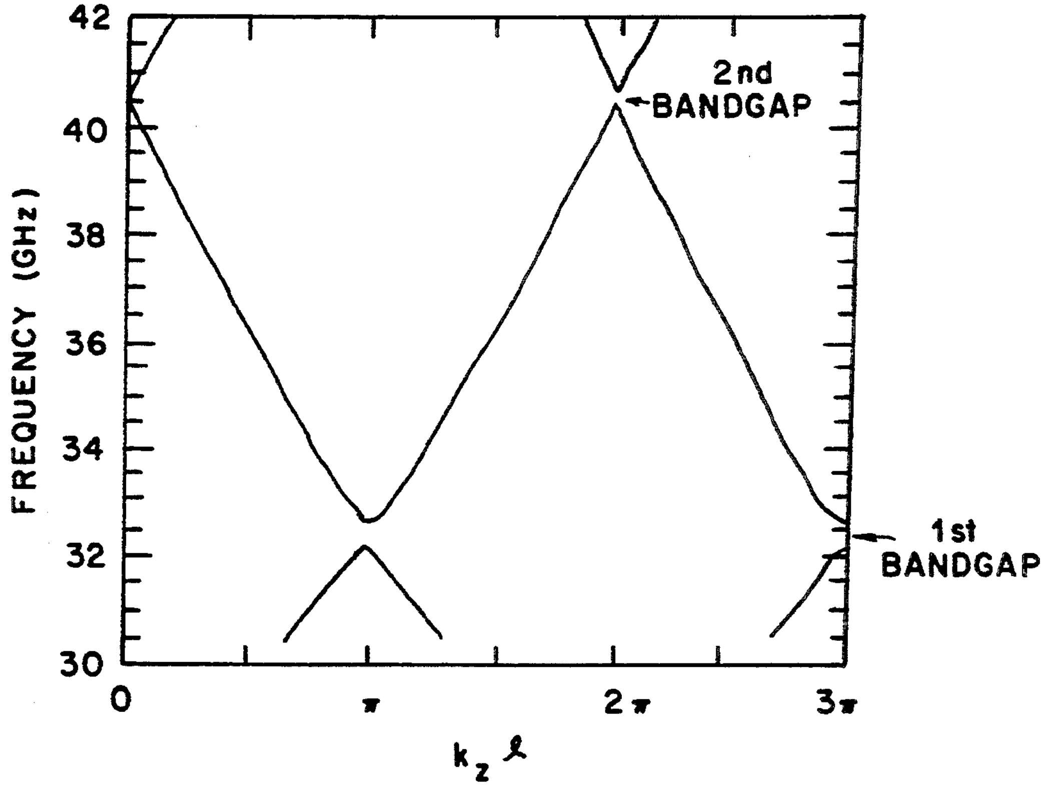
FIG. 6 illustrates numerical solutions of FIG. 5, showing bandgaps near 32.2 GHz and 40.5 GHz.

FIG. 6 illustrates plots of numerical solutions of FIG. 5, showing bandgaps near 32.2 GHz and 40.5 GHz. When the RF mismatch near the bandgaps exceeds an amplifier gain in the circuit, the device is subject to oscillations in the mid-band and its bandwidth becomes reduced because there can be no propagation of RF energy across either of the bandgaps without the occurrence of an undesirable RF oscillation in the amplifier. There are several possible ways of avoiding oscillations at the stop-band frequencies; (1) RF reactive loads, (2) ridged serpentine circuit, (3) a multi-stage configuration with the magnetic field detuned and the beam velocity ratio reduced, (4) frequency selective loads, and (5) breaking the structural periodicity by tapering l and h while maintaining the beam-wave resonance with $l/(l+h)$ unchanged.

Figure 7:
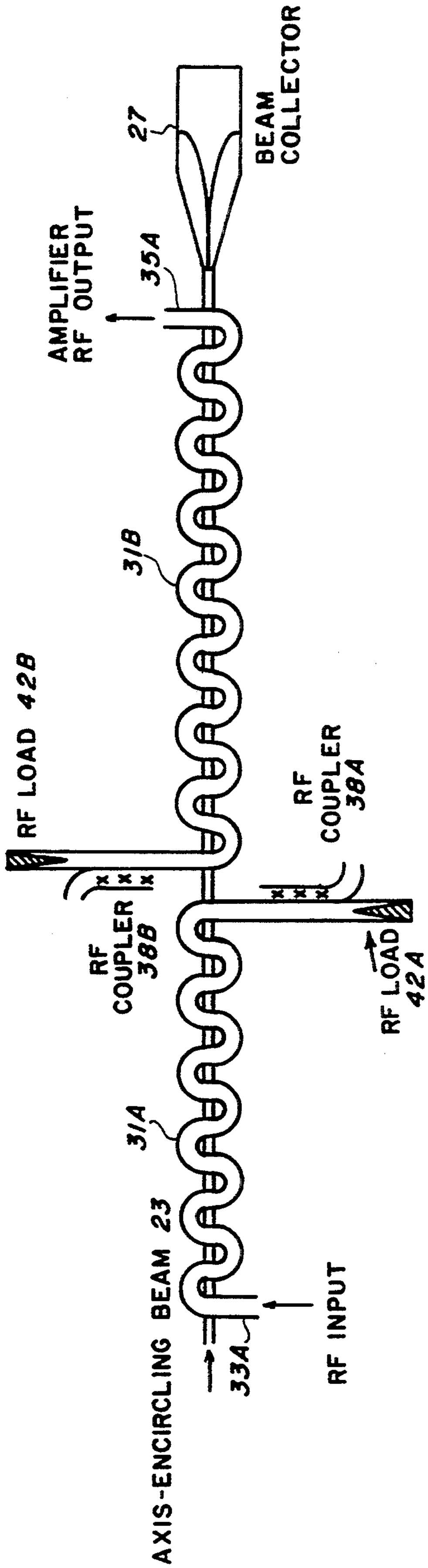
FIG. 7 shows a multi-stage configuration of the embodiments of FIGS. 1 and 10.

FIG. 7 shows an exemplary multi-stage amplifier configuration of the amplifier embodiment of FIG. 1 (and also the embodiment of FIGS. 10 and 11) of avoiding oscillation at the bandgap frequencies.

The multi-stage amplifier configuration of FIG. 7 is comprised of first and second waveguide sections 31A and 31B, respectively. This multi-stage amplifier configuration reduces an amplifier gain in each of the waveguide sections 31A and 31B less than an RF mismatch would. Under this condition, the amplifier configuration of FIG. 7 is not subject to oscillation, and basically operates in the same manner as the amplifier of FIG. 1.

In operation, an RF input signal is applied to an input end 33A of the first waveguide section 31A. This RF input signal interacts with and modulates an incoming axis-encircling electron beam 23 in just that first waveguide section 31A. The modulated electron beam 23 propagates through the beam channel holes (not shown) into the second waveguide section 31B. The spent RF input signal passes through an RF coupler 38A and is dissipated by an RF load 42A. The RF coupler 38A can be used to sample the spent RF input signal.

The modulated electron beam 23 that propagates into the second waveguide section 31B produces or creates an RF signal at a frequency corresponding to the resonance condition of FIG. 2 (namely at the frequency at which the electron beam was initially modulated in the first waveguide section 31A). The modulated electron beam and the created RF signal interact with each other in the second waveguide section 31B, enabling the created RF signal to be amplified by taking energy from the modulated electron beam that created it until that RF signal reaches saturation. The resultant amplified RF signal is coupled out of an output end 35A of the second waveguide section 31B, while the remaining electron beam energy left after interaction with the amplified RF signal propagates through the beam tunnel hole (not shown) in the second waveguide section 31B to the beam collector 27. The beam collector 27 is preferably a depressed beam collector.

Any backward wave from the second waveguide section 31B passes through an RF coupler 38B and is dissipated by an RF load 42A. The RF coupler 38B can be used to sample the backward wave.

The use of a periodic reactive element, or a beam tunnel hole, is another way that the bandgap problem can be cured. The hole is model as a shunt susceptance in the straight waveguide with a characteristic admittance $Y_0$ and a guide wavelength $\lambda_g$ is a guide wavelength where the susceptance can be determined.

It should be recalled that in FIG. 6 no beam hole was taken into account in providing numerical solutions to the equivalent circuit model of FIG. 5. The FIG. 6 solution to the problem of FIG. 5 only involved the waveguide bends and the bandgaps of FIG. 6 came from the periodicity of these waveguide bends.

Figure 8:
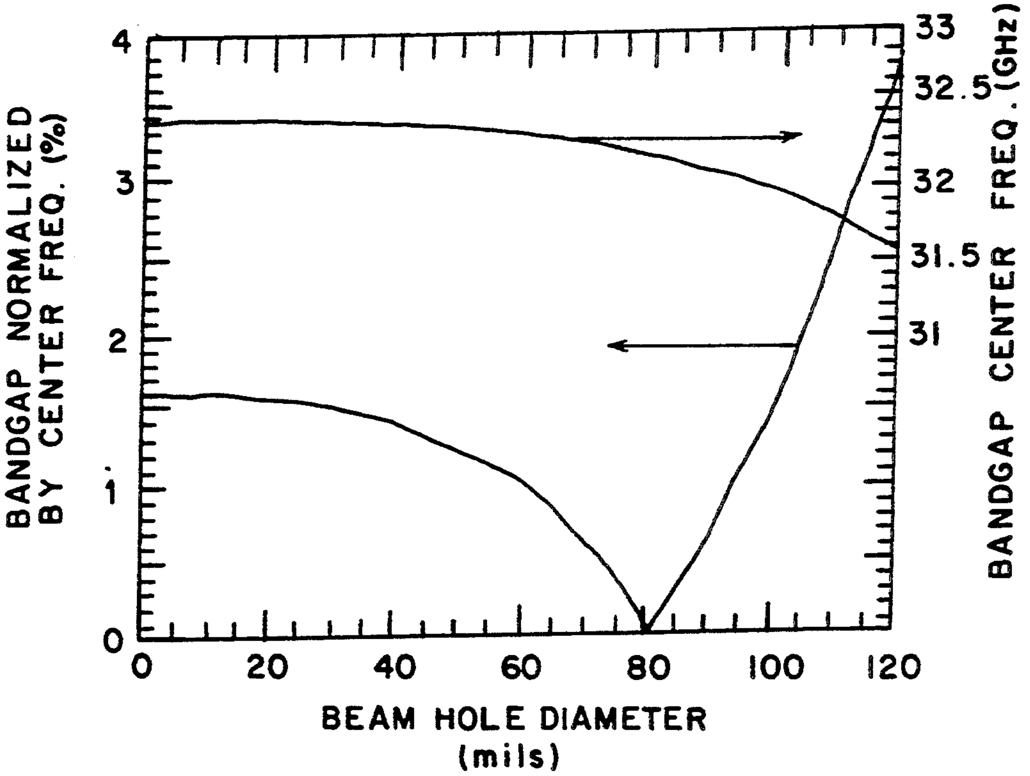
FIG. 8 illustrates the effect of a beam tunnel hole on the first bandgap of FIG. 6 and the center frequency shift of the first bandgap from about 32.2 GHz to a lower frequency of about 31.5 GHz.

FIG. 8 illustrates the effect of a beam tunnel hole on the first bandgap of FIG. 6 and the center frequency shift of the first bandgap from about 32.2 GHz to a lower frequency of about 31.5 GHz. As a beam tunnel hole diameter increases, the bandgap gradually decreases. It is interesting to note that the bandgap completely disappears and a mode coalescing of upper and low band-edges takes place near the beam tunnel hole diameter of about 82 mils when the circuit loading elements, inductive and capacitive, cancel out each other. However, further increase of a beam tunnel hole diameter beyond that 82 mil diameter rapidly increases the bandgap because the beam tunnel hole becomes a dominant factor of determining the bandgap.

Figure 9:
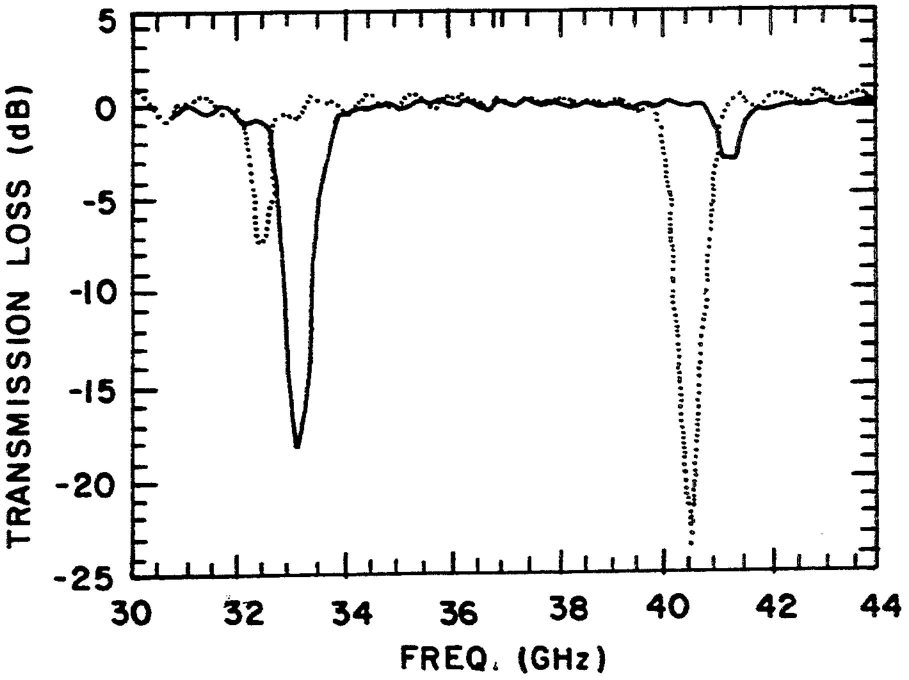
FIG. 9 is a graph showing the transmission loss through the folded waveguide gyrotron-traveling-wave-amplifier of FIG. 1 obtained from the use of the MAGIC code.

In addition to the equivalent circuit calculation of FIG. 5, the MAGIC code is used to examine the effect of the periodic beam tunnel holes on the bandgap. FIG. 9 shows transmission losses of a 12-period folded waveguide gyrotron-traveling-wave-amplifier circuit as a function of frequency for two cases: (a) a circuit with waveguide bends only in the serpentine waveguide 31 (FIG. 1) and (b) a circuit with both bends and beam tunnel holes in the serpentine waveguide 31 where the beam tunnel hole is modeled as a slot equal to the circular hole diameter of 75 mils.

The solid line in FIG. 9 is the case with bends only and shows a bandgap at about 33 GHz. In FIG. 6, this bandgap was predicted at about 32.5 GHz. Therefore, FIG. 9 is quite consistent with FIG. 6 as to this bandgap at 32.5 or 33 GHz.

The dashed line in FIG. 9 is the case with both bends and beam tunnel holes in the interaction circuit 25 of FIG. 1. With both bends and beam tunnel holes in the interaction circuit 25 the bandgap frequency shifts downward to a lower frequency and a better RF transmission is observed when the beam hole is taken into account in the circuit simulation. Thus, both the equivalent circuit model of FIG. 5 and the computer simulation code of FIG. 9 produce qualitative agreement on the transmission loss at about 32.5 GHz. In addition, both of them reach qualitative agreement on the coalescing of the bandgap at about 80 mils.

Note, as shown in FIG. 8, that a 1.6% bandgap is produced when there is no beam tunnel hole, whereas that 1.6% bandgap is reduced to zero when an 82 mil beam tunnel hole is utilized. This is a substantial improvement compared to no beam tunnel hole. With a proper choice of a beam hole diameter, it is possible to eliminate the first bandgap at about 32.5 GHz (FIG. 6) and avoid oscillations in experiments.

Figure 10:
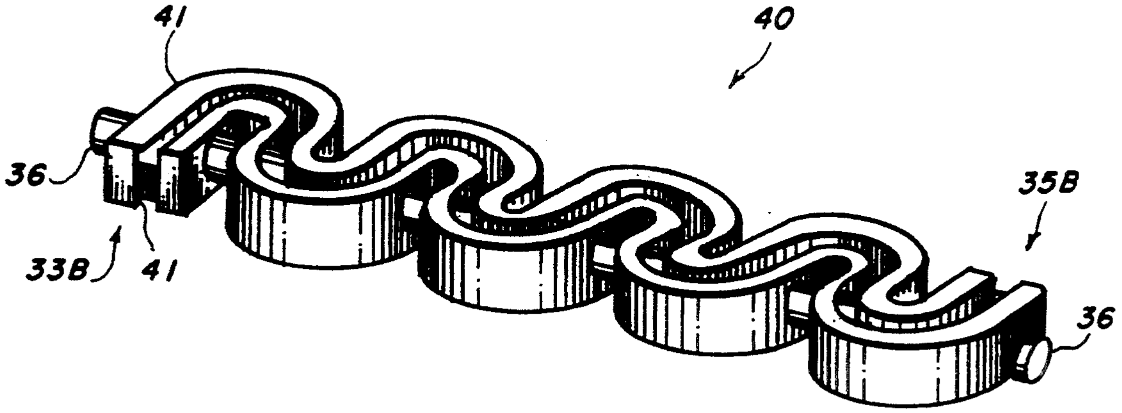
FIG. 10 illustrates a double-ridged, transverse electric, folded waveguide used in place of the folded rectangular serpentine waveguide of FIG. 1 in a second embodiment of the invention.
Figure 11:
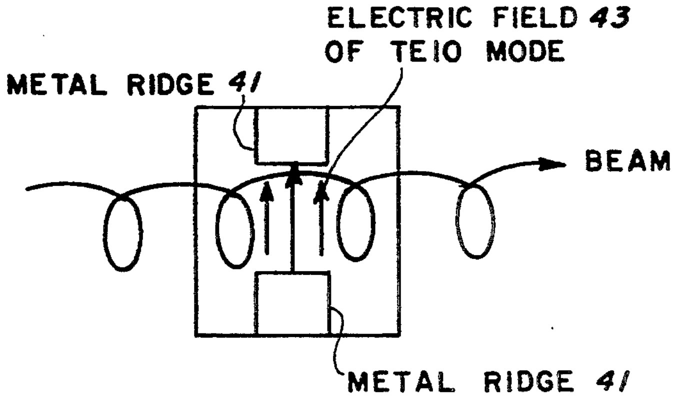
FIG. 11 illustrates a cross-sectional view of the double-ridged, transverse electric, folded waveguide of FIG. 10.

Another approach to avoiding that first bandgap and its associated bandgap oscillations is by replacing the folded rectangular serpentine waveguide 31 in FIG. 1 with a double-ridged transverse electric folded waveguide structure, which is shown in FIGS. 10 and 11. FIG. 10 illustrates a double-ridged, transverse electric, folded waveguide 40 used in place of the folded rectangular serpentine waveguide 31 of FIG. 1 in a second embodiment of the invention; and FIG. 11 illustrates a cross-sectional view of the double-ridged, transverse electric, folded waveguide 40 of FIG. 10. FIGS. 10 and 11 show metal ridges 41 in the double-ridged waveguide 40. In FIG. 11, note that the electric field line 43 is pointing up like that of the TE10 mode. The electron beam passes through the beam hole 36 and interacts with the transverse electric field injected from the input end 33B of the waveguide 40. Amplified RF is extracted from the output end 35B.

The ridged waveguide 40 of FIGS. 10 and 11 has the same cutoff frequency and dispersion characteristics as the rectangular waveguide of FIG. 1. However, one important difference between the double-ridged waveguide 40 and the rectangular waveguide 31 of FIG. 1 is that the width of the double-ridged waveguide 40 is almost half of that of the rectangular waveguide 31. Therefore, the double-ridged waveguide configuration increases the spacing of the space harmonics and reduces the gap detuning angle compared with rectangular H-plane bend folded guide.

With the width of the double-ridged waveguide 40 reduced by almost a factor of 2, the frequency of the first bandgap, which is about 32.5 GHz for the standard folded waveguide (as shown in FIG. 6), is shifted up and away from the operating frequency range to around 39 GHz for the case of a double-ridged folded waveguide.

Figure 12:
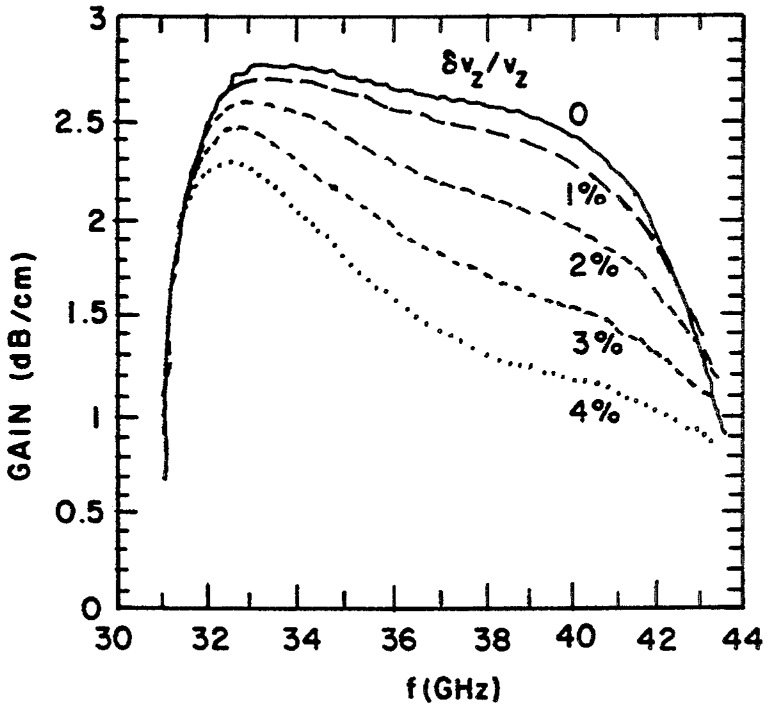
FIG. 12 is a graph of signal gain versus frequency for the double-ridged, transverse electric, folded waveguide of FIGS. 10 and 11.

FIG. 12 is a graph of signal gain versus frequency for the double-ridged, transverse electric, folded waveguide of FIGS. 10 and 11. Again, linear theory is used to derive the waveforms shown in FIG. 12 for actual velocity spreads of 0%, 1%, 2%, 3% and 4% included in the MAGIC code. Linear theory for the ridged configuration predicts a gain of 2.5–3 dB/cm and an instantaneous bandwidth of 15%–30% for $V=65$ kV, $I=3$ A axis-encircling electron beam having a velocity ratio of $\alpha=0.8$. As shown in FIG. 12, the bandwidth and gain of the device decrease as beam axial velocity spread increases. An advanced center post electron gun producing a high quality electron beam with low axial velocity spread ($\Delta v_z/v_z<2\%$) is available for use with the double-ridged, transverse electric, folded waveguide of FIGS. 10 and 11 to minimize beam axial velocity spread increases and thereby maximize the gain and bandwidth of the device.

Figure 13:
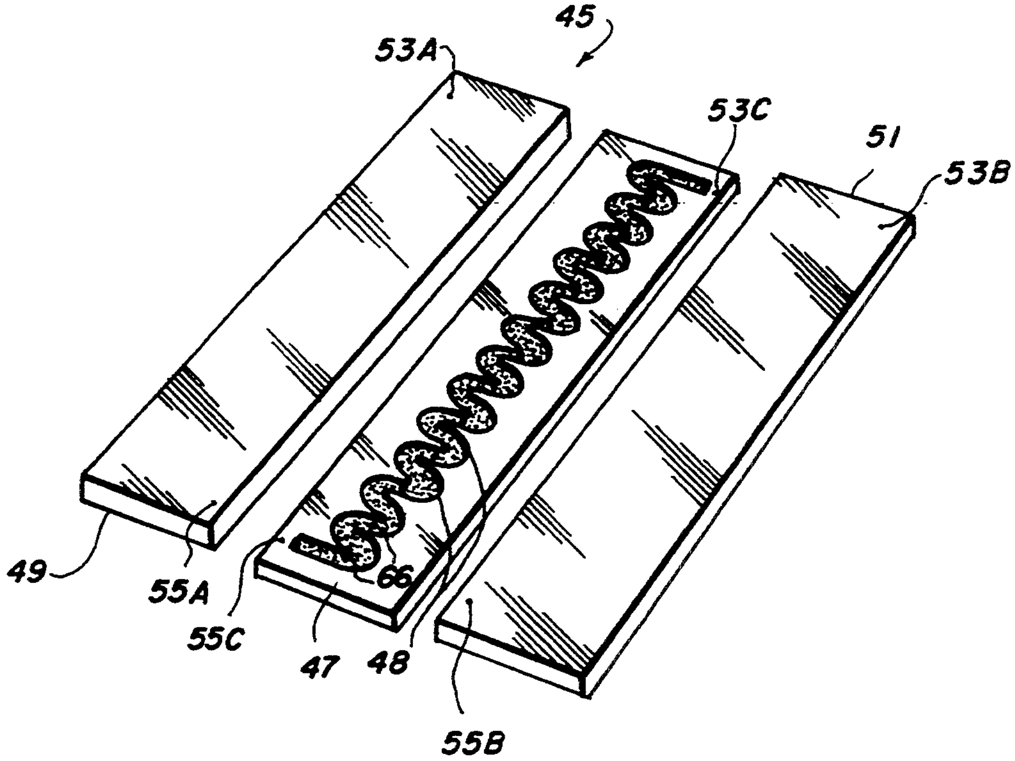
FIG. 13 illustrates a 12-period, single-stage test device of the rectangular folded waveguide of FIG. 1.

FIG. 13 illustrates a low-gain, single-stage, 35 GHz test device 45 (12 periods) having a rectangular cross-section. The test device 45 is similar to the rectangular folded waveguide 31 of FIG. 1. This test device 45 was fabricated using low-cost wire electric-discharge-machining (EDM) technology and includes a center piece 47 and two end portions 49 and 51.

The center piece 47 contains the 12-period configuration 48 of the H-plane bend rectangular waveguide 31 of FIG. 1 and the end portions 49 and 51 furnish the adjacent sides of the rectangular waveguide 31. End portion 49 contains alignment holes 53A and 55A; end portion 51 contains alignment holes 53B and 55B; and center piece 47 contains alignment holes 53C and 55C, as well as a sequence of beam tunnel holes 66.

In assembling the test device 45, the center piece 47 is sandwiched between the end portions 49 and 51 with the holes 53A, 53C and 53B being aligned with each other at one end of the assembled test device 45, and the holes 55A, 55C and 55B being aligned with each other at the other end of the assembled test device 45. After the test device 45 is assembled, the RF input and RF output are cut out of the test device 45 and a magnet (not shown) is disposed around the test device 45 to provide an exemplary one Tesla solenoid magnetic field to the device 45.

Figure 14:
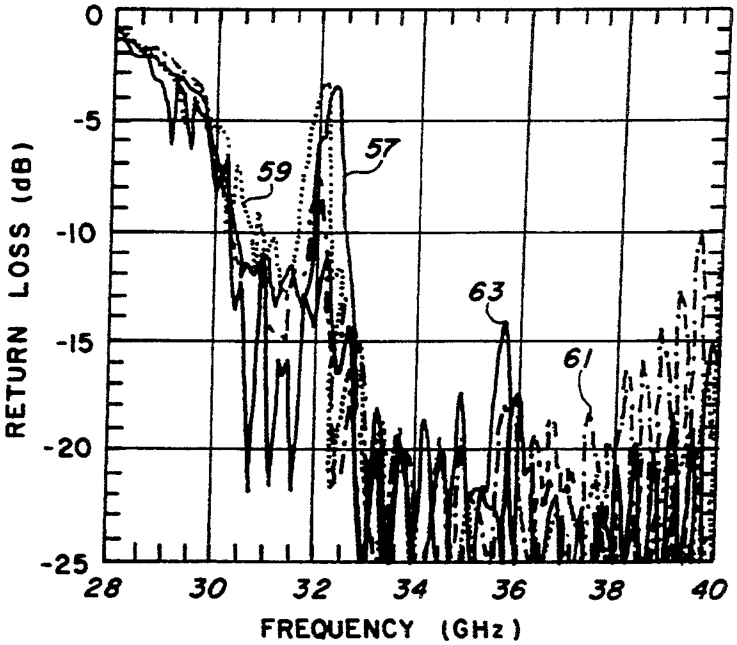
FIG. 14 illustrates the return loss measured from the test device of FIG. 13 under different conditions.

FIG. 14 shows the return loss (or reflected RF electromagnetic power) that was measured from the test device 45 of FIG. 13 as a function of frequency under different conditions. Four complete trace lines are shown in FIG. 14. The thin solid line 57 is for a beam tunnel hole diameter of 70 mils; the dotted line 59 is for a beam tunnel hole of 80 mils; the long dashed line 61 is for a beam tunnel hole of 90 mils; and the thick solid line 63 is for a beam tunnel hole of 90 mils and with impedance matching pins. Exemplary values along the vertical return loss (dB) axis of FIG. 14 mean: 0 dB means 100% reflection; −10 dB means 10% reflection; −20 dB means 1% reflection; −30 dB means 0.1% reflection; and so forth.

The beam hole loading effect of the test device 45 of FIG. 13 was tested by changing the beam tunnel hole size. As shown in FIG. 14, as the beam hole diameter increases to 90 mils, the return loss becomes better and the bandgap at ~32 GHz becomes narrower. However there is a limit as to how large the beam tunnel hole can be made. So instead of changing the size of the beam tunnel hole, impedance matching pins can be utilized to match the impedances along the rectangular serpentine waveguide. Such use of impedance matching pins to change the impedance of the rectangular waveguide corresponds to making the beam tunnel hole larger (or smaller).

With a series of impedance matching or tuning pins on the waveguide bends and near the beam holes, a return loss at the bandgap frequency becomes better than −10 dB (see the thick solid line 63 in FIG. 14). This indicates that, by introducing a proper reactive element in the circuit, the bandgap can be completely eliminated and an operating bandwidth can be extended across the bandgap without oscillations. The measured frequency shift toward a low frequency as the beam tunnel hole diameter increases consists of the predictions by both the equivalent circuit model calculations and MAGIC simulations. An excellent return loss of less than −15 dB has been measured over the Ka-band frequency range (32–39 GHz).

Figure 15:
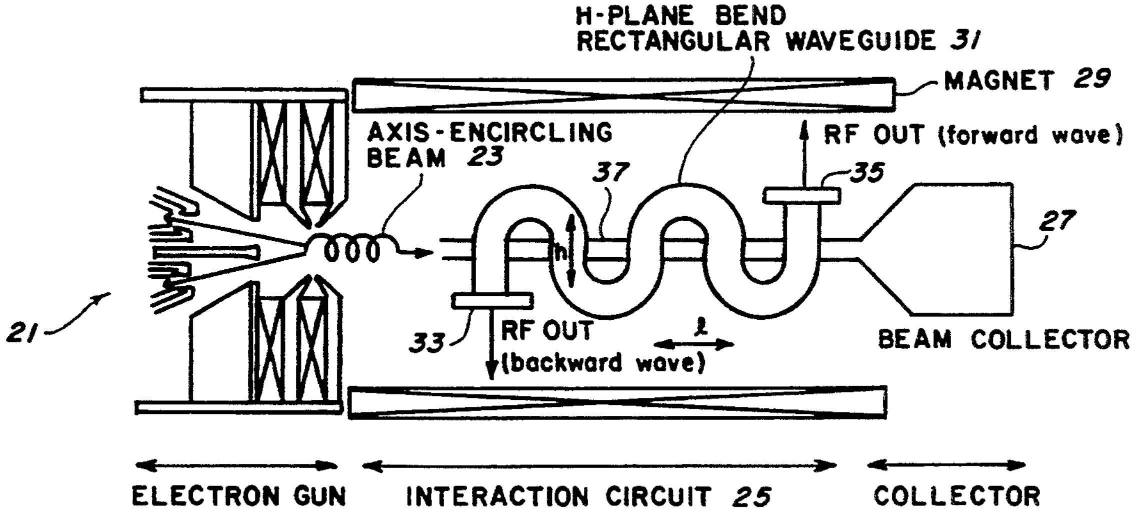
FIG. 15 is a schematic diagram of a folded waveguide gyrotron oscillator in a third embodiment of the invention.

FIG. 15 is a schematic diagram of a folded waveguide gyrotron oscillator in a third embodiment of the invention. In this third embodiment, the invention could be operated as an oscillator without the use of an external RF input signal. When the beam velocity is synchronized with a negative group velocity of a higher space harmonic mode, a strong instability takes place and a high power RF is extracted through the input side of the serpentine waveguide 31.

In the oscillator embodiment of FIG. 15, there is no RF input to the waveguide 31, and the interaction circuit 25 is responsive to the axis-encircling electron beam for developing an RF signal. If that RF signal is a backward wave, it is outputted from the first end 33 of the interaction circuit 25. On the other hand, if that RF signal is a forward wave, it is outputted from the second end 35 of the interaction circuit 25. In the oscillator configuration, the operating frequency is tunable by adjusting the external magnetic field and beam voltage.

The folded waveguide gyrotron-traveling-wave-amplifier/folded waveguide gyrotron oscillator can be operated at a high beam cyclotron harmonic. With the high beam cyclotron harmonic operation, the required external magnetic field is reduced by a factor of the harmonic number.

Potential advantages of the folded waveguide gyrotron-traveling-wave-amplifier/folded waveguide gyrotron oscillator of the invention over various other prior art broadband gyrotron-traveling-wave-amplifier devices, such as the tapered fast wave gyrotron-traveling-wave-tube and the dielectric loaded slow wave cyclotron amplifier (SWCA), include: compactness, robustness, ease of fabrication, low cost, broadband metallic circuit, broad bandwidth due to no gain discontinuity across the light line, simplicity of coupling and circuit severing, natural separation of beam and RF applicable for depressed collector operation, high power handling capability, and low magnetic field operation.

The folded waveguide gyrotron-traveling-wave-amplifier/folded waveguide gyrotron oscillator circuit of the invention has additional advantages over the conventional E-plane bend, folded waveguide traveling-wave-tube including: larger beam tunnel for high power beam injection with little distortion of waveguide field structure, easy mode coalescing by adjusting a beam hole diameter, higher efficiency and therefore increased output power through the use of magnetic field tapering, and fundamental forward space harmonic operation.

Therefore, what has been described are a folded waveguide, gyrotron-traveling-wave-amplifier capable of producing high power, broadband millimeter wave radiation in preferred embodiments of the invention and a folded waveguide gyrotron oscillator in another preferred embodiment of the invention.

While the invention has been illustrated and described in detail in the drawings and foregoing description, it should readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A folded waveguide gyrotron-traveling-wave-amplifier comprising:

means for generating a high power electron beam encircling a preselected magnetic field axis;

means for producing an RF signal having a bandwidth in a preselected frequency domain and a transverse electric field;

a beam collector; and an interaction circuit having a beam tunnel hole passing therethrough, an input end for receiving the RF signal, and an output end, said interaction circuit being responsive to the axis-encircling electron beam passing through the beam tunnel hole and to the RF signal for enabling the high power electron beam to exchange energy with the transverse electric field to cause transverse beam modulation of the axis-encircling electron beam and RF amplification of the RF signal and a broadening of the instantaneous bandwidth of the amplified RF signal to occur by way of the negative mass instability in the fundamental forward space harmonic of both fast and slow wave regions in the preselected frequency domain, said output end of said interaction circuit coupling the amplified RF signal out of said amplifier, and said axis-encircling beam from said interaction circuit being applied to said beam collector.

2. The folded waveguide gyrotron-traveling-wave-amplifier of claim 1 further including:

means for developing a solenoid magnetic field around said interaction circuit having a predetermined magnetic field strength.

3. The folded waveguide gyrotron-traveling-wave-amplifier of claim 2 wherein:

said developing means produces a magnetic field strength in the range from about 1 Tesla to about 4 Tesla.

4. The folded waveguide gyrotron-traveling-wave-amplifier of claim 2 wherein said interaction circuit comprises:

an H-plane bend rectangular serpentine waveguide in which the orientation of the magnetic field changes along said H-plane bend rectangular serpentine waveguide.

5. The folded waveguide gyrotron-traveling-wave-amplifier of claim 4 wherein said H-plane bend rectangular serpentine waveguide is a first said H-plane bend rectangular serpentine waveguide, said folded waveguide gyrotron-traveling-wave-amplifier further including:

a plurality of H-plane bend rectangular serpentine waveguides operationally coupled together in sequence between said output end of said first H-plane bend rectangular serpentine waveguide and said beam collector, each of said plurality of H-plane bend rectangular serpentine waveguides having a narrow wall containing a beam tunnel hole for allowing the modulated axis-encircling beam to sequentially pass through the beam tunnel holes in said first and said plurality of H-plane bend rectangular serpentine waveguides to said beam collector.

6. The folded waveguide gyrotron-traveling-wave-amplifier of claim 4 wherein:

said H-plane bend rectangular serpentine waveguide is comprised of a sequence of waveguide bends containing a frequency selective RF loss material at each bend.

7. The folded waveguide gyrotron-traveling-wave-amplifier of claim 4 wherein said folded waveguide gyrotron-traveling-wave-amplifier operates at a frequency centered in a desired frequency range, and wherein:

said beam tunnel hole through said H-plane bend rectangular serpentine waveguide has a size which is selected to minimize any bandgap in the preselected frequency range.

8. The folded waveguide gyrotron-traveling-wave-amplifier of claim 4 wherein said folded waveguide gyrotron-traveling-wave-amplifier operates at a frequency centered in a desired frequency range, and wherein:

said H-plane bend rectangular serpentine waveguide is comprised of a sequence of waveguide bends respectively containing a plurality of impedance matching pins to match impedances along the serpentine waveguide in order to minimize any bandgap in the desired frequency range.

9. The folded waveguide gyrotron-traveling-wave-amplifier of claim 2 wherein said interaction circuit comprises:

an H-plane bend, double ridged, transverse electric, folded waveguide in which the orientation of the magnetic field changes along said H-plane bend double ridged folded waveguide.

10. The folded waveguide gyrotron-traveling-wave-amplifier of claim 9 wherein said H-plane bend, double ridged, transverse electric, folded waveguide is a first said H-plane bend, double ridged, transverse electric, folded waveguide, said folded waveguide gyrotron-traveling-wave-amplifier further including:

a plurality of H-plane bend, double ridged, transverse electric, folded waveguides operationally coupled together in sequence between said output end of said first H-plane bend, double ridged, transverse electric, folded waveguides and said beam collector, each of said plurality of H-plane bend, double ridged, transverse electric, folded waveguides having a narrow wall containing a beam tunnel hole for allowing the modulated axis-encircling beam to sequentially pass through the beam tunnel holes in said first and said plurality of H-plane bend, double ridged, transverse electric, folded waveguides to said beam collector.

11. The folded waveguide gyrotron-traveling-wave-amplifier of claim 9 wherein:

said H-plane bend, double ridged, transverse electric, folded waveguide is comprised of a sequence of waveguide bends containing a frequency selective RF loss material at each bend.

12. The folded waveguide gyrotron-traveling-wave-amplifier of claim 9 wherein said folded waveguide gyrotron-traveling-wave-amplifier operates at a frequency centered in a desired frequency range, and wherein:

said beam tunnel hole through said H-plane bend, double ridged, transverse electric, folded waveguide has a size which is selected to minimize any bandgap in the preselected frequency range.

13. The folded waveguide gyrotron-traveling-wave-amplifier of claim 9 wherein said folded waveguide gyrotron-traveling-wave-amplifier operates at a frequency centered in a desired frequency range, and wherein:

said H-plane bend, double ridged, transverse electric, folded waveguide is comprised of a sequence of waveguide bends respectively containing a plurality of impedance matching pins to match impedances along said double ridged, transverse electric, folded waveguide in order to minimize any band-gap in the desired frequency range.

14. The folded waveguide gyrotron-traveling-wave-amplifier of claim 1 wherein:

said generating means is an electron gun for producing an axis-encircling electron beam with a preselected beam power.

15. The folded waveguide gyrotron-traveling-wave-amplifier of claim 2 wherein:

said developing means is selected from the group consisting of a permanent magnet and an electromagnet.

16. The folded waveguide gyrotron-traveling-wave-amplifier of claim 1 wherein:

said beam collector is depressed.

17. A folded waveguide gyrotron-traveling-wave-amplifier comprising:

an electron gun for transmitting an axis-encircling beam of electrons with large transverse energy along a first path having an axis;

an RF source for producing and applying in a second path an RF input signal having a bandwidth in a preselected frequency domain and having a transverse electric field;

means for generating a solenoid magnetic field parallel to the axis along the first path;

a beam collector; and an H-plane bend serpentine waveguide positioned within the solenoid magnetic field and having a narrow wall containing a beam tunnel hole for passing the axis-encircling beam of electrons therethrough to said beam collector, an output end, and an input end for receiving and passing the RF input signal through the H-plane bend serpentine waveguide to said output end to modulate the axis-encircling electron beam, said modulated axis-encircling electron beam amplifying the RF input signal and also broadening the instantaneous bandwidth of the amplified RF input signal through the negative mass instability in the fundamental forward space harmonic of both fast and slow wave regions in the preselected frequency domain.

18. The folded waveguide gyrotron-traveling-wave-amplifier of claim 17 wherein:

said generating means is selected from the group consisting of a permanent magnet and an electromagnet.

19. The folded waveguide gyrotron-traveling-wave-amplifier of claim 17 wherein said H-plane bend serpentine waveguide comprises:

an H-plane bend rectangular serpentine waveguide in which the orientation of the magnetic field changes along said H-plane bend rectangular serpentine waveguide.

20. The folded waveguide gyrotron-traveling-wave-amplifier of claim 17 wherein said H-plane bend serpentine waveguide comprises:

an H-plane bend, double ridged, transverse electric, folded waveguide in which the orientation of the magnetic field changes along said H-plane bend, double ridged, transverse electric, folded waveguide.

21. A folded waveguide gyrotron-oscillator comprising:

means for generating a high power electron beam encircling a preselected magnetic field axis;

a beam collector; and an interaction circuit having a beam tunnel hole passing therethrough, an input end, and an output end, said interaction circuit being responsive to the axis-encircling electron beam passing through the beam tunnel hole for exciting RF power to one of said input and output ends by way of the negative mass instability in the fundamental forward space harmonic of both fast and slow wave regions in a preselected frequency domain, said output end coupling forward wave power out of said interaction circuit and said input end coupling backward wave power out of said interaction circuit, and said axis-encircling beam from said interaction circuit being applied to said beam collector.

* * * * *